United States Patent

[11] 3,624,202

| [72] | Inventors | Roland Jaques<br>Strengigartenweg 28, Allschwil;<br>Bernhard Noelpp, Flughafenstrasse 31,<br>Basel, both of Switzerland |
|---|---|---|
| [21] | Appl. No. | 1,020 |
| [22] | Filed | Jan. 6, 1970 |
| [45] | Patented | Nov. 30, 1971 |
| [32] | Priority | Jan. 22, 1969 |
| [33] | | Switzerland |
| [31] | | 916/69 |

[54] PROCESS FOR STILLING PAIN
10 Claims, No Drawings

[52] U.S. Cl. ........................................................ 424/229
[51] Int. Cl. ...................................................... A61k 27/00

[50] Field of Search ............................................ 424/299,
DIG. 7

[56]        References Cited
UNITED STATES PATENTS
3,318,882   5/1967   Schmidt et al. ...............   260/247.1

*Primary Examiner*—Stanley J. Friedman
*Attorneys*—Harry Goldsmith, Joseph G. Kolodny and Mario A. Monaco ABSTRACT: The invention concerns a process for stilling pain which consists in administering to a patient a pharmaceutical composition containing 1-[5-(dimethylsulfamoyl)-anthraniloyl]-4-methyl-piperazine or a salt thereof.

PROCESS FOR STILLING PAIN

The present invention concerns a process for stilling pain characterized in that a pharmaceutical composition containing 1-[5-(dimethylsulfamoyl)-anthraniloyl]-4-methyl-piperazine of the formula

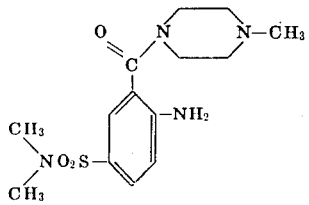

in its free form or in the form of a nontoxic salt, as active ingredient as administered to a warm-blooded being.

1-[5-(dimethylsulfamoyl)-anthraniloyl]-4-methylpiperazine is already known (cf. e.g. U.S. Pat. No. 3,318,882). Up to the present, however, nothing has been known about any analgesic effect of this compound.

As salts there come into consideration more especially therapeutically acceptable acid addition salts, such, for example, as salts with hydrohalic acids, such as hydrochloric or hydrobromic acid, sulfuric acids, phosphoric acids, nitric acid, perchloric acid, aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic or para-aminosalicylic acid, methanesulfonic, ethanesulfonic, hydroxyethanesulfonic, ethylenesulfonic acid; halogenobenzenesulfonic, toluenesulfonic, naphthalenesulfonic acid or sulfanilic acid; methionine, tryptophan, lysine or arginine.

The active substance of the invention is advantageously administered in the form of a pharmaceutical preparation which contains the active substance in the free form or in the form of a therapeutically acceptable salt thereof, in the admixture or conjunction with a pharmaceutical organic or inorganic, solid or liquid carrier suitable, for example for topical, enteral e.g. oral or rectal, or particularly parenteral, e.g. intramuscular or intravenous, administration. Substances can be considered for this purpose that do not react with the new compounds, such, for example, as water, gelatine, lactose, starches, stearyl alcohol, magnesium stearate, talc, vegetable oils, benzyl alcohols, gums, propyleneglycols, white petroleum jelly or other known medicinal carriers. The pharmaceutical preparations may be, for example, in the form of tablets, dragées, capsules, suppositories, ointments, creams or in liquid form as solutions (e.g. as elixir or syrup), suspensions or emulsions. They may be sterilized and/or contain auxiliary substances, such as preserving agents, stabilizers, wetting agents or emulsifiers, solution promoters or salts for varying the osmotic pressure, or buffers. They may also contain other therapeutically valuable substances. The pharmaceutical preparations are obtained by the conventioned methods.

The dosage to be used depends on the type of pain to be stilled and on the individual patient. In the case of intramuscular or intravenous administration (including drip infusion) single doses of 50 to 500 mg., particularly 100 to 300 mg., are given as a rule to adults; the dosage administered in the course of 24 hours may amount to 1 g. (i.m. or i.v., also drip infusion).

For oral administration the single dose is advantageously 150 to 400 mg., especially 200 to 300 mg., per dosage unit; the daily dosage may comprise 5 single doses, i.e. for example 1 to 1.5 g.

In the case of rectal administration the single dose is advantageously 400 mg. to 1.5 g., especially 500 mg. to 1 g.

The analgesic of the invention is suitable for stilling pains of varying genesis, particularly post-traumatic and postoperative pains, pains connected with inflammation or tumours, as well as neuralgic disorders (neuritis, lumbago etc.).

Apart from 1-[5-(dimethylsulfamoly)-anthraniloyl]-4-methylpiperazine or a salt thereof, the analgesic of this invention may contain other active substances, for example other substances having an analgesic and/or antiphlogistic action and/or the usual additives to analgesics, as for example coffeine or vitamins, such as aneurin or ascorbic acid. Examples of further analgesic and/or antiphlogistic substances are: paracetamol, phenacetine, pyrazolone derivatives, such as aminopyrine, antipyrine, propyphenazone, phenylbutazone or methampyrone, salicylic acid derivatives, such as acetylsalicylic acid or salicylamide, steroids having an anti-inflammatory action, such as glucocorticoids, for example hydrocortisone, cortisone, prednisone, prednisolone, dexamethasone, paramethasone or flumethasone or their 21-esters, as for example flumethasone pivalate, or alkaloids and salts thereof, such as quinone, codeine, morphine, dihydrocodeine, papaverine or ergotamine. Further active substances that may be incorporated are substances having a hypnotic action, such as barbituric acid derivatives, for example diethylbarbituric acid, diallylbarbituric acid, isobutylallylbarbituric acid or phenylethylbarbituric acid, or glutaric acid imides, such as glutethimide. The hypnotics are preferably used in a quantity not inducing sleep.

The following Examples illustrate the invention without limiting its scope in any respect.

EXAMPLE 1

Ampuls containing an injection solution for intramuscular or intravenous administration may be prepared for example with the following ingredients:

Ingredients per ampul:

| | |
|---|---|
| 1-[5-(dimethylsulfamoyl)-anthraniloyl]-4-methyl-piperazine hydrochloride | 100 mg. |
| Sodium chloride | 5.6 mg. |
| Distilled water to make up | 2 ml. |

Method

The 1-[5-(dimethylsulfamoyl)-anthraniloyl]-4-methyl-piperazine hydrochloride and the sodium chloride are dissolved in the distilled water which has been boiled with nitrogen. The solution is filtered in the conventional manner, filled into ampuls and sealed under nitrogen-gassing. The sealed ampuls are sterilized in super-heated steam at 120° C. for 20 minutes.

EXAMPLE 2

Tablets containing 250 mg. of active substance may be prepared for example as follows:

Ingredients per tablet:

| | |
|---|---|
| 1-[5-(dimethylsulfamoyl)-anthraniloyl]-4-methyl-piperazine hydrochloride | 250.0 mg. |
| Mannitol | 60.0 mg. |
| Wheat starch | 91.0 mg. |
| Gelatine | 4.0 mg. |
| Talc | 13.0 mg. |
| Magnesium stearate | 2.0 mg. |
| | 420.0 mg. |

Method

The 1-[5-(dimethylsulfamoyl)-anthraniloyl]-4-methyl-piperazine hydrochloride is mixed with the mannitol and part of the wheat starch, and the mixture passed through a sieve. The gelatine is dissolved with five times the quantity of water on a water-bath and the powdery mixture kneaded with the solution until a plastic mass is formed. The mass is passed through a sieve having a mesh of about 3 mm., dried and the dried granulate passed through a sieve again. The remaining wheat starch, talc and magnesium stearate are then added. The resulting mixture is compressed into tablets weighing 420 mg.

EXAMPLE 3

Suppositories containing 1-[5-(dimethylsulfamoyl)-anthraniloyl]-4-methylpiperazine hydrochloride as active substance may be prepared, for example as follows:

| | |
|---|---|
| a. 1-[5-(dimethylsulfamoyl)-anthraniloyl]-4-methyl-piperazine hydrochloride | 500 mg. |
| Adeps solidus to make up | 2000 mg. |
| b. 1-[5-(dimethylsulfamoyl)-anthraniloyl]-4-methyl-piperzaine hydrochloride | 750 mg. |
| Cocoa butter to make up | 2000 mg. |

The suppositories are prepared in the conventional manner.

EXAMPLE 4

Suppositories containing 1-[5-(dimethylsulfamoyl)-anthraniloyl]-4-methylpiperazine methane sulfonate as active substance may be prepared, for example, as follows:

| | |
|---|---|
| a. 1-[5-(dimethylsulfamoyl)-anthraniloyl]-4-methyl-piperazine methane sulfonate | 582 mg. |
| Adeps solidus to make up | 2000 mg. |
| b. 1-[5-(dimethylsulfamoyl)-anthraniloyl]-4-methyl-piperazine methane sulfonate | 873 mg. |
| Cocoa butter to make up | 2000 mg. |

The suppositories are prepared in the conventional manner.

We claim:

1. A process for stilling pain characterized in that a pharmaceutical composition containing an effective analgesic amount of 1-[5-(dimethylsulfamoyl)-anthraniloyl]-4-methyl-piperazine or a nontoxic salt thereof as active ingredient together with a pharmaceutical carrier is administered to a warm-blooded being.

2. A process as claimed in claim 1, wherein the analytic composition is administered intramuscularly or intravenously.

3. A process as claimed in claim 2, wherein the active ingredient is administered in single doses of 50 to 500 mg.

4. A process as claimed in claim 2, wherein the active ingredient is administered in single doses of 100 to 300 mg.

5. A process as claimed in claim 1, wherein the analgesic composition is administered orally.

6. A process as claimed in claim 5, wherein the active ingredient is administered in single doses of 150 to 400 mg.

7. A process as claimed in claim 5, wherein the active ingredient is administered in single doses of 200 to 300 mg.

8. A process as claimed in claim 1, wherein the analgesic composition is administered rectally.

9. A process as claimed in claim 8, wherein the active ingredient is administered in single doses of 400 mg. to 1.5 g.

10. A process as claimed in claim 8, wherein the active ingredient is administered in single doses of 500 to 100 mg.

* * * * *

6653/E

PO-1050
(5/69)

UNITED STATES PATENT OFFICE
CERTIFICATE OF CORRECTION

Patent No. 3,624,202          Dated November 30, 1971

Inventor(s) ROLAND JAQUES ET AL

It is certified that error appears in the above-identified patent and that said Letters Patent are hereby corrected as shown below:

Column 4, line 29, delete "100 mg." and insert --- 1000 mg. ---

Signed and sealed this 13th day of June 1972.

(SEAL)
Attest:

EDWARD M. FLETCHER, JR.
Attesting Officer

ROBERT GOTTSCHALK
Commissioner of Patents